US 10,421,143 B2

United States Patent
Albrecht

(10) Patent No.: US 10,421,143 B2
(45) Date of Patent: Sep. 24, 2019

(54) ENERGY STORAGE CADDY FOR A WELDING SYSTEM

(75) Inventor: Bruce Patrick Albrecht, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 310 days.

(21) Appl. No.: 12/894,025

(22) Filed: Sep. 29, 2010

(65) Prior Publication Data

US 2011/0114608 A1    May 19, 2011

Related U.S. Application Data

(60) Provisional application No. 61/261,958, filed on Nov. 17, 2009.

(51) Int. Cl.
| | | |
|---|---|---|
| *B23K 9/00* | (2006.01) | |
| *B23K 9/06* | (2006.01) | |
| *B23K 9/10* | (2006.01) | |
| *H01M 10/46* | (2006.01) | |
| *H01M 10/48* | (2006.01) | |
| *H01M 10/0525* | (2010.01) | |
| *H01M 10/30* | (2006.01) | |
| *H01M 10/34* | (2006.01) | |
| *H02J 7/00* | (2006.01) | |

(52) U.S. Cl.
CPC .......... *B23K 9/1006* (2013.01); *B23K 9/1056* (2013.01); *H01M 10/46* (2013.01); *H01M 10/48* (2013.01); *H01M 10/0525* (2013.01); *H01M 10/30* (2013.01); *H01M 10/345* (2013.01); *H02J 7/0047* (2013.01); *H02J 7/0063* (2013.01)

(58) Field of Classification Search
CPC . B23K 9/00; B23K 9/06; B23K 9/10–9/1093; H05B 7/11
USPC ................... 219/130.1, 130.4, 132, 133, 134
See application file for complete search history.

(56) References Cited

U.S. PATENT DOCUMENTS

| | | | |
|---|---|---|---|
| 3,365,644 A | | 1/1968 | Smallman et al. |
| 3,641,306 A | * | 2/1972 | Oakes ........................... 219/113 |

(Continued)

FOREIGN PATENT DOCUMENTS

| | | | | |
|---|---|---|---|---|
| EP | 1 535 691 A2 | 6/2005 | | |
| EP | 1535691 A2 | * | 6/2005 | ............... B23K 9/10 |

(Continued)

OTHER PUBLICATIONS

MQ Multiquip; "180 Amp Battery-Powered Welder"; www.multiquip.com; Jan. 2008; 2 pgs.

(Continued)

*Primary Examiner* — Michael A Laflame, Jr.
(74) *Attorney, Agent, or Firm* — McAndrews, Held & Malloy, Ltd.

(57) ABSTRACT

Embodiments of energy storage caddies adapted to couple to a welding power supply are provided. The energy storage caddies may include an energy storage device, a charger, control circuitry, and power conversion circuitry. Certain control circuitry may be adapted to control the energy storage device to discharge to provide a direct current (DC) voltage output to the welding power supply when a weld load demand is detected, to monitor a charge level of the energy storage device, and to alert a user to an error when the charge level of the energy storage device falls below a predetermined limit.

19 Claims, 3 Drawing Sheets

(56) References Cited

U.S. PATENT DOCUMENTS

| | | | |
|---|---|---|---|
| 4,142,091 A * | 2/1979 | Biethan, Sr. | B23K 9/1006 219/130.1 |
| 4,590,357 A * | 5/1986 | Winkler | 219/130.1 |
| 4,705,934 A | 11/1987 | Winkler | |
| 4,801,780 A | 1/1989 | Hayes | |
| 5,086,208 A | 2/1992 | Habermann | |
| 5,189,361 A * | 2/1993 | Meier | 322/90 |
| 5,198,698 A | 3/1993 | Paul et al. | |
| 5,233,159 A | 8/1993 | Day | |
| 5,250,786 A * | 10/1993 | Kikuchi et al. | 219/130.32 |
| 5,410,126 A | 4/1995 | Miller et al. | |
| 5,736,711 A | 4/1998 | Joos et al. | |
| 5,991,169 A | 11/1999 | Kooken | |
| 5,993,983 A | 11/1999 | Rozon | |
| 6,051,809 A * | 4/2000 | Colella | B23K 9/1006 219/133 |
| 6,066,834 A | 5/2000 | Rebold | |
| 6,111,215 A | 8/2000 | Lilly | |
| 6,175,217 B1 | 1/2001 | Da Ponte et al. | |
| 6,225,596 B1 | 5/2001 | Chandler et al. | |
| 6,331,694 B1 | 12/2001 | Blankenship | |
| 6,512,201 B2 | 1/2003 | Blankenship | |
| 6,621,050 B2 * | 9/2003 | Plantz | B23K 9/1006 219/133 |
| 6,653,596 B2 | 11/2003 | Blankenship | |
| 6,747,246 B2 | 6/2004 | Crandell, III | |
| 6,777,649 B2 * | 8/2004 | Reynolds et al. | 219/132 |
| 6,818,860 B1 * | 11/2004 | Stava | B23K 9/1006 219/130.1 |
| 6,982,398 B2 * | 1/2006 | Albrecht | 219/133 |
| 7,183,517 B2 | 2/2007 | Albrecht et al. | |
| 7,202,636 B2 | 4/2007 | Reynolds et al. | |
| 2002/0117491 A1 * | 8/2002 | Griffith | 219/231 |
| 2003/0042237 A1 * | 3/2003 | Brofft | F02B 63/04 219/133 |
| 2003/0151393 A1 | 8/2003 | Takano | |
| 2003/0164645 A1 * | 9/2003 | Crandell, III | 307/80 |
| 2004/0182846 A1 * | 9/2004 | Silvestro | B23K 9/1006 219/133 |
| 2005/0040788 A1 | 2/2005 | Tseng | |
| 2005/0109748 A1 * | 5/2005 | Albrecht et al. | 219/130.1 |
| 2005/0161450 A1 * | 7/2005 | Stava | 219/133 |
| 2005/0224478 A1 | 10/2005 | Stropki, Jr. et al. | |
| 2006/0027548 A1 | 2/2006 | Albrecht | |
| 2006/0033473 A1 | 2/2006 | Stanzel et al. | |
| 2006/0037953 A1 * | 2/2006 | Matthews et al. | 219/133 |
| 2006/0102693 A1 * | 5/2006 | Bender et al. | 228/101 |
| 2006/0278623 A1 * | 12/2006 | Christopher et al. | 219/137.7 |
| 2007/0081803 A1 * | 4/2007 | Lindsay et al. | 392/392 |
| 2007/0181547 A1 | 8/2007 | Vogel et al. | |
| 2007/0187376 A1 | 8/2007 | Albrecht et al. | |
| 2007/0215585 A1 | 9/2007 | O'Connor | |
| 2007/0251931 A1 | 11/2007 | Lambirth et al. | |
| 2007/0257084 A1 | 11/2007 | Carrier et al. | |
| 2007/0262058 A1 * | 11/2007 | Ulrich et al. | 219/99 |
| 2007/0278993 A1 | 12/2007 | Vogel | |
| 2008/0073330 A1 * | 3/2008 | Diedrick et al. | 219/133 |
| 2008/0083705 A1 * | 4/2008 | Peters | B23K 9/1068 219/61 |
| 2008/0237201 A1 * | 10/2008 | Shipulski et al. | 219/121.48 |
| 2008/0298102 A1 * | 12/2008 | Geissler | 363/89 |

FOREIGN PATENT DOCUMENTS

| | | |
|---|---|---|
| EP | 1852206 A2 | 11/2007 |
| JP | 5318117 A2 | 12/1993 |
| JP | 6087082 A2 | 3/1994 |
| JP | 6182548 A2 | 7/1994 |
| WO | 2008156946 A1 | 12/2008 |

OTHER PUBLICATIONS

Go Weld; Broco, Inc.; "Product Information/Specifications"; http://www.goweld.com/prodinfo.html; Feb. 14, 2008; pp. 1-2.

Go Weld; Broco, Inc.; "Battery Selection"; http://www.goweld.com/batteryselection.html; Feb. 14, 2008; 1 pg.

Readywelder; "Ready Welder II Worlds Most Portable MIG Welder!"; http://www.readywelder.com/home.html; Feb. 14, 2008, pp. 1-4.

Goweldinst; Broco Go Weld; "Operating Instructions Manual"; 2002, pp. 1-43.

ARC MFG; Panel Beater; http://www.arcmfg.com/arcmfg/brochurepagetwo.html; Feb. 20, 2008, 1 pg.

Ready Welder Corporation; "Ready Welder II—Operation Manual"; Battery/DC Powered Portable MIG Welder and Spool Gun; www.readywelder.com; pp. 1-20.

International Search Report for application No. PCT/US2010/056754 dated Mar. 7, 2011.

\* cited by examiner

ENERGY STORAGE CADDY FOR A WELDING SYSTEM

CROSS REFERENCE TO RELATED APPLICATIONS

This application is a Non-Provisional Patent Application of U.S. Provisional Patent Application No. 61/261,958 entitled "Battery Pack", filed Nov. 17, 2009, which is herein incorporated by reference.

BACKGROUND

The invention relates generally to welding systems and, more particularly, to primary power supplies for welding power sources.

Welding is a process that has become increasingly ubiquitous in various industries and applications. As such, a variety of welding applications, such as in construction and shipbuilding, may require welding devices that are portable and can easily be transported to a remote welding location. Accordingly, it is often desirable for such welding devices to be operable as standalone units remote from a power grid or other stationary primary power source. Unfortunately, to replace a traditional welder with a hybrid system may present a high monetary cost. Furthermore, the incorporation of alternate power sources into the welder may add to the bulkiness of the overall package, thus decreasing portability. Accordingly, there exists a need for improved welding systems that overcome such drawbacks.

BRIEF DESCRIPTION

In an exemplary embodiment, a welding system includes a welding power supply adapted to provide a power output for a welding operation. The welding system also includes an energy storage caddy. The energy storage caddy includes at least one energy storage device, is adapted to couple to the welding power supply, and is adapted to provide a direct current (DC) voltage output to the welding power supply. The welding power supply is adapted to receive the DC voltage output and to convert the DC voltage output to the power output for the welding operation.

In another embodiment, a retrofit kit for a welding system includes an energy storage caddy adapted to generate a power output and to provide the generated power output to a welding power supply. The energy storage caddy includes an energy storage device adapted to discharge to produce the power output and control circuitry coupled to the energy storage device and adapted to regulate the power output based on a charge level of the energy storage device, a load demand at the welding power supply, and a temperature of the energy storage device.

In another embodiment, an energy storage caddy for a welding system includes an energy storage device and control circuitry adapted to control the energy storage device to discharge to provide a direct current (DC) voltage output to a welding power supply when a weld load demand is detected, to monitor a charge level of the energy storage device, and to alert a user to an error when the charge level of the energy storage device falls below a predetermined limit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of an energy storage caddy adapted to retrofit existing welding power supplies is provided. The energy storage caddy is adapted to provide primary power to a welding power supply, which may include power conversion circuitry configured to convert the received power to an appropriate weld power output. To that end, the energy storage caddy may include one or more energy storage devices, such as batteries, fuel cells, and so forth, capable of providing power (e.g., by discharging) without the need for any external connections. That is, the energy storage caddy is capable of operating as a standalone unit during operational periods. Furthermore, the energy storage caddy may be capable of recharging the one or more energy storage devices disposed therein, for example, via coupling to an external or internal charger and primary power supply.

Figure 1:
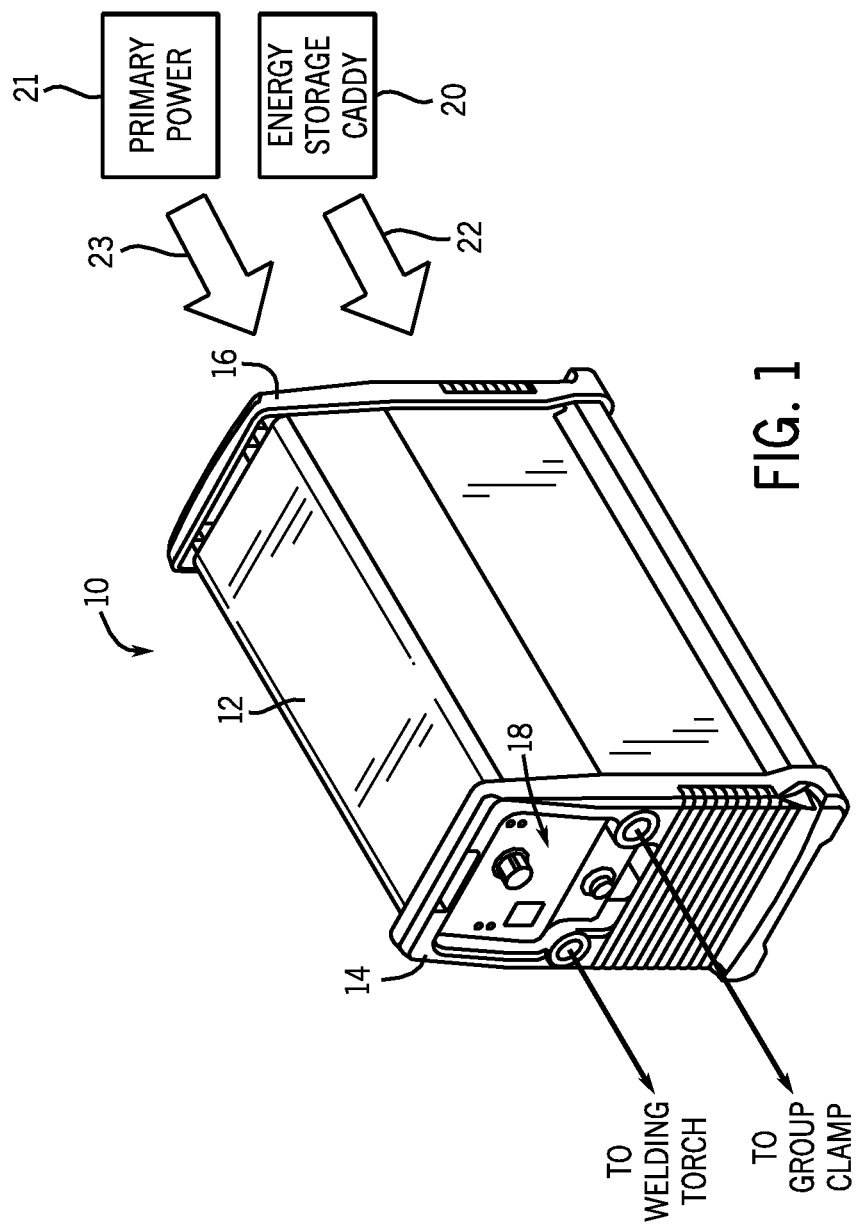
FIG. 1 illustrates an exemplary welding system including a welder and an energy storage caddy in accordance with aspects of the present invention.

Turning now to the drawings, FIG. 1 is a perspective view of an exemplary welding system 10 in accordance with aspects of the present invention. The illustrated welding system 10 includes a welding power supply 12 with a front panel 14, a back panel 16, and a control panel 18 disposed in the front panel 14. As shown, the front panel 14 is adapted to receive a welding torch and a ground clamp, which extend to a weld location. The system 10 further includes an energy storage caddy 20 adapted to be coupled to the welding power supply, for example, via a receptacle disposed in back panel 16, as indicated by arrow 22. As such, the system 10 may be capable of generating and providing power for a welding operation as a standalone unit without coupling to an additional primary power source (e.g., a power grid or generator). In the illustrated embodiment, the welding system 10 further includes primary power 21 that may also supply the welding power source with power, for example, when the welding operation occurs in close proximity to the primary power source, as indicated by arrow 23.

It should be noted that the energy storage caddy 20 may be capable of retrofitting existing welding power supplies that typically require a connection to a primary power source. As such, the energy storage caddy may be capable of providing portability to power supplies that were designed for use in close proximity to a primary power source, such as power from a wall plug. For example, the energy storage caddy 20 may be capable of providing a DC voltage output between approximately 80V and 500V to power existing welding, cutting, and heating power supplies. For further example, some embodiments of the energy storage caddy 20 may be capable of providing a DC output between approximately 110V and 300V. As such, embodiments of the energy storage caddy are adapted to allow the welding power supply to operate for a predetermined period of time (e.g., as long as the energy storage device has sufficient charge) when other AC power is not available or is inconvenient. Furthermore, in some embodiments, more than one energy storage caddy 20 may be utilized to supply the welder 12 with power throughout a welding operation. For example, when located remote from an alternate primary power source, multiple energy storage caddies may be utilized in series or in parallel to provide the necessary power for a welding operation.

During operation, the energy storage caddy 20 is adapted to provide a power output to the welding power supply 10. To that end, the energy storage caddy 20 may include one or more of the exemplary components illustrated in the block diagram of FIG. 2. The illustrated energy storage caddy 20 includes a controller 24, an energy storage unit 26, a charger 28, and power conversion circuitry 30. The controller 24 includes control circuitry 32 and memory 34. The energy storage unit includes an energy storage device 36 and an optional additional energy storage device 36', although any number of energy storage devices may be included in further embodiments. As shown the energy storage caddy 20 is configured to provide a power output 38 that is routed to the welder and an auxiliary power output 40, although in other embodiments, the caddy 20 may not provide the auxiliary output 40.

The energy storage unit 26 is adapted to generate and provide a power output suitable for use by a welder. For example, the power output may be a DC voltage output within a range accepted by current welding power supplies. To that end, the energy storage unit 26 includes energy storage devices 36 and 36'. The energy storage devices may be Li ion batteries, Ni-Mh batteries, Ni—Cd batteries, fuel cells, a combination thereof, or any other suitable standalone power generator. In one embodiment, the energy storage device 36 is a battery configured to discharge to produce the power output 38. Still further, in some embodiments, the outputs of one or more energy storage devices may be coupled to produce the power output 38. Additionally, the energy storage unit 26 may be adapted to utilize multiple energy storage devices in series, for example, activating a new device when the previous device is not longer charged.

In the illustrated embodiment, the charger 28 is shown located in the caddy 20 and receiving primary power 41 from an external source. However, in other embodiments, the charger 28 may be located external to the caddy 20. For example, in one embodiment, the energy storage device 36 may be configured to be removed from the caddy 20 and placed in the externally located charger 28 for charging before being replaced in the unit. During use, the charger 28 is configured to recharge the energy storage device(s) from a primary power source. For example, the energy storage devices may be recharged from a larger welder, grid power, and so forth.

During operation, the power conversion circuitry 30 is configured to receive a power output from the energy storage device 36 and to convert the received power output to an appropriate auxiliary power output 40. For example, the power conversion circuitry may be adapted to receive a DC power input and to convert the input to an AC power output appropriate for use by auxiliary devices, such as lights and grinders. It should be noted that some embodiments of the caddy 20 may not include power conversion circuitry 30 and may not output the auxiliary output 40.

Still further, during operation, the controller 24 is configured to control operation of the components of the caddy 20 to meet the power output demand of the welder and to reduce or eliminate the possibility of damage to the caddy and/or the welder. To that end, the controller 24 includes control circuitry 32 coupled to memory 34. The control circuitry 32 may be configured to monitor the charge level of the energy storage device 36 and to recharge the energy storage device when the charge level is low and a primary power source is available for charging. Additionally, the control circuitry 32 may maintain the energy storage device 36 at a predetermined temperature and otherwise manage operation of the energy storage device, as described in detail below. To that end, the control circuitry 32 may store parameters to the memory 34 and retrieve such parameters during operation as necessary. For example, the memory 34 may include information regarding allowable charge level for the battery, allowable temperature levels for the battery, and so forth.

Figure 3:
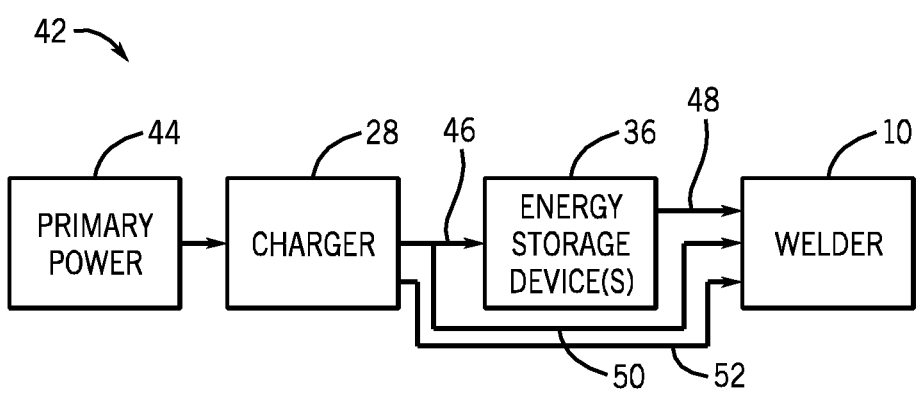
FIG. 3 is a block diagram illustrating an exemplary charging system in accordance with aspects of the present invention.

FIG. 3 is a block diagram illustrating an exemplary charging system 42 for the energy storage device 36 in accordance with aspects of the present invention. The charging system 42 includes primary power 44, the charger 28, the energy storage devices 36 and the welder 10. The charging system 42 illustrates exemplary ways in which the energy storage device may be charged during welding. For example, in one embodiment, the primary power 44 may be supplied to the charger 28 and routed through the energy storage device, as indicated by arrow 46. A portion of the incoming power may be dedicated to recharging the energy storage device 36 and another portion of the incoming power may be routed to the welder 10, as indicated by arrow 48, to meet the power requirements of the welding operation.

In another embodiment, the primary power 44 may be routed to the charger 28, and power from the charger 46 may be split to provide the energy storage device 36 with charging power and to provide the welder with power, as indicated by arrow 50. Still further, primary power 44 may be routed through the charger 28 and directly to the welder 10, as indicated by arrow 52, and a separate power output may be provided to the energy storage device 36 from the charger 28, as indicated by arrow 46. As such, the energy storage device 36 may be adapted to be charged during welding or when a weld is not occurring.

Figure 2:
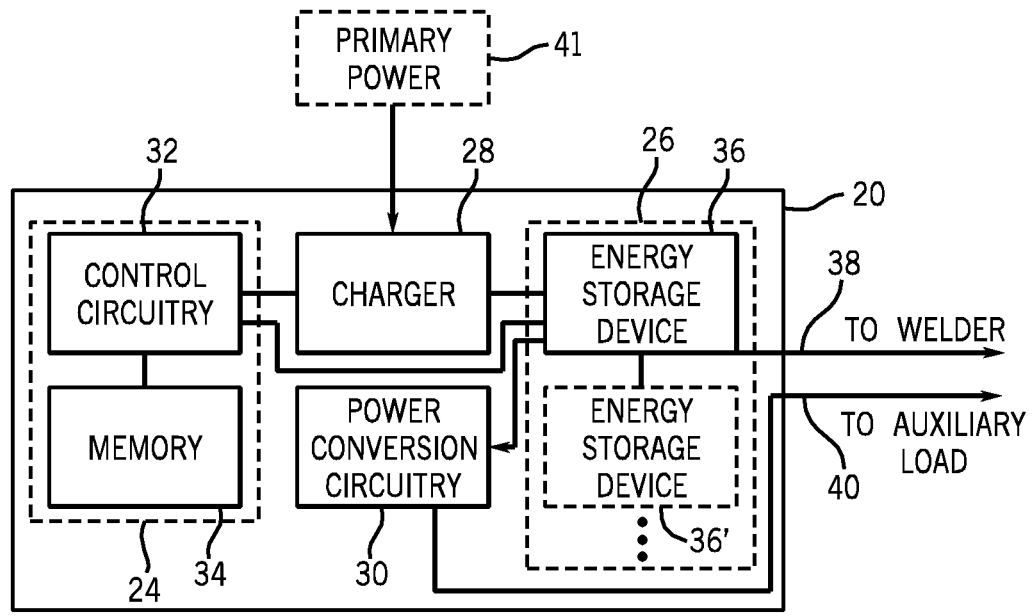
FIG. 2 is a block diagram illustrating exemplary components of the energy storage caddy of FIG. 1 in accordance with aspects of the present invention.
Figure 4:
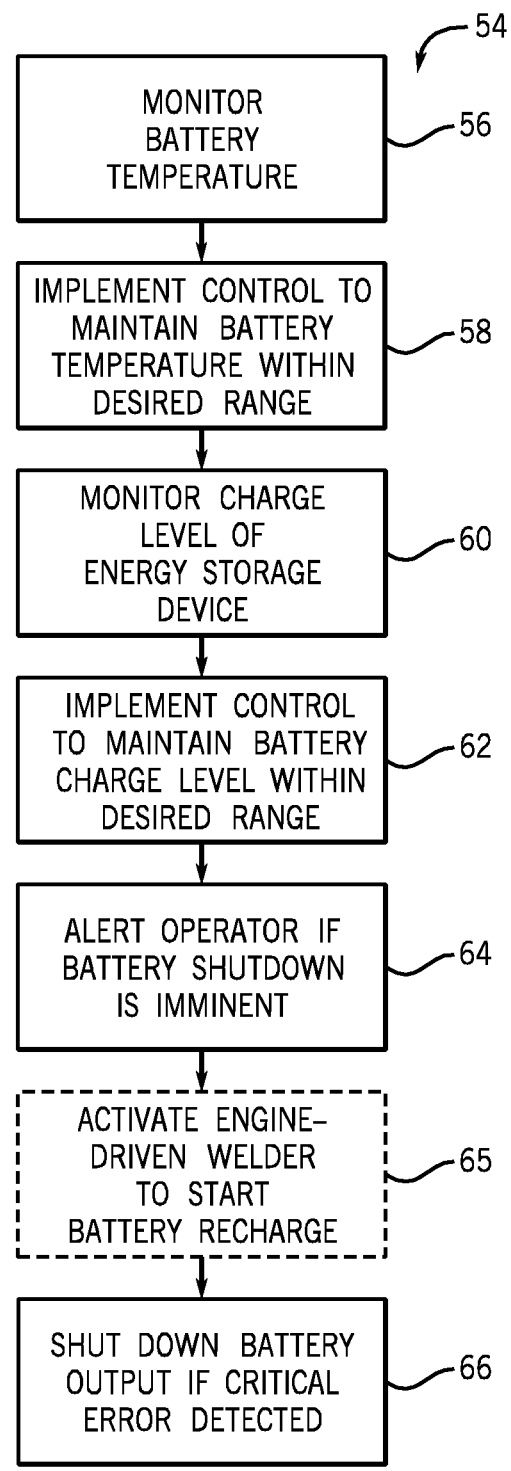
FIG. 4 is a block diagram illustrating exemplary control logic that may be employed by control circuitry that may be disposed in the energy storage caddy of FIG. 1 in accordance with aspects of the present invention.

FIG. 4 illustrates an exemplary method 54 that may be employed by the controller 24 of FIG. 2 to manage operation of the energy storage device 36 in an embodiment in which the energy storage device is a battery. The method 54 begins by monitoring the battery temperature (block 56). Such a step may be of importance for the maintenance of the battery during extreme weather (e.g., cold or warm temperatures) to maintain depletion rates of the battery within a predetermined range. The method 54 further includes the step of implementing control to maintain the battery temperature within a desired range (block 58). For example, a predetermined acceptable battery temperature may be maintained in the memory 34, and if the battery temperature exceeds such a range, the operator may be alerted to a battery temperature error.

The method further includes monitoring the charge level of the battery (block 60) and implementing control to maintain the battery charge level within a desired range (block 62). Here again, the memory 34 may store the desired charge level ranges, and the control circuitry 32 may monitor the charge level of the battery to ensure that the charge level of the battery is maintained within the desired range. For example, if the battery charge level is depleted to a predetermined threshold level, the control circuitry may alert the operator that the battery needs to be recharged soon.

Still further, the method 54 includes alerting the operator if battery shutdown is imminent (block 64), activating an engine-driven welder to start battery recharge (block 65) if possible, and shutting down the battery output if a critical error is detected (block 66). For example, if primary power for recharging is not available and the battery charge level is depleted below a desired threshold, the controller may alert the operator to the error and shut down battery output to substantially reduce or prevent the likelihood of damage to the battery and/or the welder. For further example, if primary power (e.g., an engine-driven generator) is available for charging, the controller may command activation of the primary power source via a wired or wireless communication device, thus starting the recharging of the battery.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a welding power supply configured to receive primary power from a primary power source and to generate a power output for a welding operation based on the primary power; and
   an energy storage caddy comprising at least one energy storage device and control circuitry coupled to the at least one storage device, the energy storage caddy configured to be physically separable from the welding power supply and adapted to electrically couple to the welding power supply,
   wherein the at least one energy storage device is configured to generate a voltage output for the welding power supply, wherein the voltage output is a DC voltage output of at least 110V, and wherein the welding power supply is configured to receive the voltage output and to generate the power output based on the voltage output.

2. The welding system of claim 1, wherein the energy storage caddy further comprises a charger configured to receive the primary power and to utilize the primary power to charge the at least one storage device when the power output is not being utilized by the welding operation.

3. The welding system of claim 1, wherein the control circuitry is configured to regulate the voltage output based on at least one of a charge level of the at least one energy storage device or a temperature of the at least one energy storage device.

4. The welding system of claim 1, wherein the at least one energy storage device comprises a battery.

5. The welding power supply of claim 1, wherein the primary power source is a generator and the voltage output is configured to be coupled with a primary power output from the generator to provide the power output for the welding operation.

6. A retrofit kit for a welding system, comprising:
   an energy storage caddy configured to be physically separable from a welding power supply and adapted to electrically couple to the welding power supply, wherein the welding power supply is configured to generate a welding power output for a welding operation based on primary power received from a primary power source when the welding power supply is electrically coupled to the primary power source, and to generate the welding power output based on stored power received from the energy storage caddy when the welding power supply is electrically coupled to the energy storage caddy, the energy storage caddy comprising:
   an energy storage device configured to discharge to produce the stored power, and
   control circuitry coupled to the energy storage device and configured to control the stored power sent to the welding power supply based on at least one of a charge level of the energy storage device or a temperature of the energy storage device, wherein the stored power comprises a direct current (DC) voltage output of at least 110V.

7. The retrofit kit of claim 6, wherein the energy storage caddy further comprises a charger configured to charge the energy storage device when the control circuitry detects a low charge level of the energy storage device.

8. The retrofit kit of claim 6, wherein the control circuitry is further configured to alert a user to the presence of an error when the temperature of the energy storage device is not within a predetermined temperature range and the charge level of the battery is not within a predetermined charge level range.

9. The retrofit kit of claim 6, wherein the control circuitry is further configured to command a generator via a wired or wireless communication link to turn ON to provide alternating current (AC) power to charge the energy storage device.

10. The retrofit kit of claim 7, wherein the control circuitry is configured to control the charger to charge the energy storage device when a welding operation is not occurring.

11. The retrofit kit of claim 6, wherein the energy storage device comprises at least one of a Li ion battery, a Ni-Mh battery, a Ni-Cd battery, or a fuel cell.

12. The retrofit kit of claim 6, wherein the energy storage caddy further comprises power conversion circuitry electrically coupled to the energy storage device, the power conversion circuitry configured to convert the stored power from DC to AC.

13. The retrofit kit of claim 12, wherein the energy storage caddy is further configured to provide the AC power output to one or more auxiliary devices.

14. An energy storage caddy for a welding system, comprising:
   an energy storage device configured to be physically separable from a welding power supply and adapted to electrically couple to the welding power supply,
   wherein the welding power supply is configured to generate a welding power output for a welding operation based on primary power received from a primary power source when the welding power supply is electrically coupled to the primary power source, and to generate the welding power output based on stored power received from the energy storage device when the welding power supply is electrically coupled to the energy storage device;
   control circuitry configured to control the energy storage device to discharge a direct current (DC) voltage output to the welding power supply as the stored power, to monitor a charge level of the energy storage device, and to alert a user to an error when the charge level of the energy storage device falls below a predetermined limit, wherein the DC voltage output is at least 110V.

15. The energy storage caddy of claim 14, wherein the energy storage device is configured to be removed from the energy storage caddy.

16. The energy storage caddy of claim 14, configured to be coupled to a charger adapted to restore charge to the energy storage device when the energy storage device is not fully charged.

17. The energy storage caddy of claim 14, further comprising power conversion circuitry configured to convert the DC voltage output to an AC power output to power one or more auxiliary devices.

18. The welding system of claim 1, wherein the primary power source is a power grid.

19. The welding system of claim 1, further comprising a controller configured to regulate operation of the welding power supply and the energy storage caddy between a first mode of operation, a second mode of operation, and a third mode of operation, wherein the controller is configured to supply only the power output from the welding power supply to the welding operation in the first mode of operation, the controller is configured to supply only the voltage output from the energy storage caddy to the welding operation in the second mode of operation, and the controller is configured to supply the power output from the welding power supply and the voltage output from the energy storage caddy to the welding operation in the third mode of operation.

\* \* \* \* \*